(12) United States Patent
Stewart et al.

(10) Patent No.: US 6,963,961 B1
(45) Date of Patent: Nov. 8, 2005

(54) INCREASING DSP EFFICIENCY BY INDEPENDENT ISSUANCE OF STORE ADDRESS AND DATA

(75) Inventors: Charles H. Stewart, Richardson, TX (US); Shannon A. Wichman, McKinney, TX (US)

(73) Assignee: LSI Logic Corporation, Milpitas, CA (US)

( * ) Notice: Subject to any disclaimer, the term of this patent is extended or adjusted under 35 U.S.C. 154(b) by 621 days.

(21) Appl. No.: 09/901,455

(22) Filed: Jul. 9, 2001

(51) Int. Cl.⁷ .............................................. G06F 13/00
(52) U.S. Cl. ....................................... 711/169; 711/154
(58) Field of Search ........................................ 711/169

(56) References Cited

U.S. PATENT DOCUMENTS

| | | | | |
|---|---|---|---|---|
| 5,261,071 A | * | 11/1993 | Lyon | 711/140 |
| 5,590,294 A | * | 12/1996 | Mirapuri et al. | 712/244 |
| 5,615,350 A | * | 3/1997 | Hesson et al. | 712/218 |
| 5,754,812 A | * | 5/1998 | Favor et al. | 712/216 |
| 5,835,747 A | * | 11/1998 | Trull | 712/216 |
| 5,872,951 A | * | 2/1999 | Tran | 712/218 |
| 5,887,160 A | * | 3/1999 | Lauritzen et al. | 712/222 |
| 5,930,518 A | * | 7/1999 | Suzuki | 712/1 |
| 6,119,204 A | * | 9/2000 | Chang et al. | 711/141 |
| 6,502,187 B1 | * | 12/2002 | Miyagawa | 712/225 |
| 2002/0007450 A1 | * | 1/2002 | Witt et al. | 712/23 |
| 2002/0046324 A1 | * | 4/2002 | Barroso et al. | 711/122 |

* cited by examiner

Primary Examiner—Reba I. Elmore
(74) Attorney, Agent, or Firm—Conley Rose, P.C.

(57) ABSTRACT

An improved method of operating a digital signal processor instruction pipeline and a memory interface for implementing the method. Memory store requests are separated into an address phase and a data phase. Store addresses are issued to the interface when ready and held in a queue until the corresponding store data is available. The store data is issued to the interface and held in a queue until its corresponding store address is to be coupled to memory. The pipeline operates more efficiently because it does not have to wait for store data before issuing the address and related control signals. Data coherency is maintained because load and store addresses are issued at the same pipeline stage and executed in the order issued.

27 Claims, 4 Drawing Sheets

New Pipeline Stage - Function

1

2

3

4 - All addresses are generated here

5 - Store and Load addresses are issued here

6 - Load data returns here

7

8 - Store data is issued here

Old Pipeline Stage - Function
1
2
3
4 - All addresses are generated here
5 - Load addresses are issued here
6 - Load data returns here
7
8 - Store data and store address issued here

Figure 1 (prior art)

New Pipeline Stage - Function
1
2
3
4 - All addresses are generated here
5 - Store and Load addresses are issued here
6 - Load data returns here
7
8 - Store data is issued here

Figure 2 though store data and store address are issued—but they must be issued to the memory subsystem at the same time. This means that the store address must be held at the pipeline stage where it is generated until the store data is also generated. This delays issuance of the store request and slows the pipeline.

INCREASING DSP EFFICIENCY BY INDEPENDENT ISSUANCE OF STORE ADDRESS AND DATA

CROSS-REFERENCE TO RELATED APPLICATIONS

This application incorporates by reference for all purposes U.S. patent application Ser. No. 09/847,848, entitled "A Parameterizable Queued Memory Access System" by inventor Charles H. Stewart, which was filed on Apr. 30, 2001 and is assigned to the same assignee as the present application.

BACKGROUND OF THE INVENTION

The present invention relates to digital signal processors with instruction pipelines and more particularly to digital signal processors having an improved method of operating an instruction pipeline which issues store addresses separately from the associated store data and a memory interface which implements the method.

The Digital Signal Processor, DSP, is a specialized microprocessor which can process signal streams with complex mathematical formulas in real time. A DSP is typically ten to fifty times more powerful than typical microprocessor devices such as the microprocessor cores used in ASICs. To achieve high operating speed, DSPs normally use tightly coupled memory to which they can write data, and from which they can read data, very quickly. Applicant's ZSP DSP has an open architecture which allows it to be easily programmed and used for numerous applications.

One of the operating features which allows DSPs to operate at high speed is the use of an instruction pipeline. FIG. 1 is an illustration of an eight-stage instruction pipeline which has been used in the ZSP DSP. Only the functions relating to loading (reading) data from memory, and storing (writing) data to memory, are included in FIG. 1. In this illustration, addresses for both loading and storing data are generated in the fourth stage. A load operation is completed by issuing the load address in stage five and receiving the data from memory in stage six. While store addresses are also generated in stage four, the data to be stored is not available until the eighth stage of the pipeline. This is because the data to be stored is often generated in mathematical operations which are performed in stage seven. As a result, the store address cannot be issued until the eighth stage, at which time both the store address and data are issued. This delay tends to slow DSP operating speed.

Load and store instructions must be issued in the order in which they are generated in order to maintain coherency. When a load request is issued after a store request, the subsequent load request must wait until the store request is completed. In the FIG. 1 pipeline, this means that the load must be delayed, i.e. must wait in the fourth stage, until the store request has made it to the eighth stage and been issued. This can result in several clock cycles of delay for the load request and slows overall performance of the DSP.

The memory subsystem which controls read and write operations of a memory may have two common address ports. This speeds DSP operation by allowing it to issue two transaction requests simultaneously. The fact that the FIG. 1 pipeline must delay load requests while waiting for a store request to complete may create further problems with the dual address ports. While a load request is waiting in stage 4 for the store request to be completed, another load request may occur. When the store reaches stage eight, there will be two load requests which need to issue. With only two address ports, only one load request can be issued with the store request. The other must wait another clock cycle before it can be issued. This may also slow the performance of the DSP.

SUMMARY OF THE INVENTION

In accordance with the present invention, store addresses and store data are issued independently. A processor instruction pipeline is operated by separating a store operation into an address phase and a data phase. In the address phase, the store address is issued when it is ready. In the data phase, the store data corresponding to the store address is issued when it is available. Load and store addresses are issued at the same pipeline stage, so that coherency may be maintained without slowing the pipeline, and therefore without slowing the processor.

BRIEF DESCRIPTION OF THE DRAWINGS

FIG. 1 is an illustration of a prior art processor instruction pipeline with function list;

FIG. 2 is an illustration of a processor instruction pipeline according to the present invention;

DETAILED DESCRIPTION OF EMBODIMENTS

Figure 3:
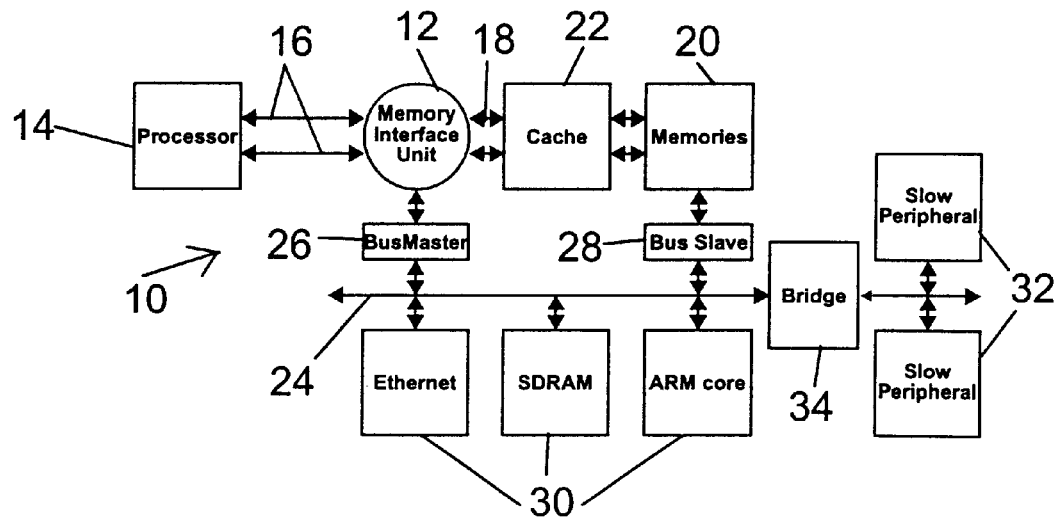
FIG. 3 is a system block diagram illustrating a processor coupled through an interface unit to memory and through a system bus to other system components.

With reference to FIG. 2, an instruction pipeline according to the present invention will be described. This is an eight-stage pipeline like the one illustrated in FIG. 1. Both store and load addresses are generated at stage four, as occurred in the FIG. 1 pipeline. However, at stage 5, both the load and store addresses are issued to the memory subsystem. Other control signals, such as the load or store control, may also be issued with the addresses. At stage six, load data returns in response to load requests. Store data is generated at or before stage 7, the stage in which mathematical operations are executed. In stage eight, store data is issued to the memory subsystem.

The term "store request" is generally understood to include a memory address, control signals and data. In similar fashion, a "load request" includes an address and control signals. An address may be considered to be a control signal and the terms "control signals", "address and control signals" and "address" have been used somewhat interchangeably. For prior art systems as indicated in FIG. 1, a store address was issued at the same time as store data, since the memory system needs the address and data and any necessary control signals to execute the request.

In this specification, a complete store request includes an address, necessary controls and store data, but the store data is issued independently of the control signals, including the store address and any other control signals. The term "store address" is used herein to mean a memory address and control signals, if any, needed to designate the address as being part of a store request and not part of a load request. Likewise, the term "load address" is used herein to mean a memory address and control signals, if any, needed to designate the address as being part of a load request and not part of a store request. Separate control signals are not necessarily needed to indicate load or store status of an address. For example, the load and store addresses could be issued on separate busses.

While this embodiment describes an eight-stage pipeline, other pipeline lengths may be used if desired. For example, five stage pipelines are often used and much longer pipelines have also been used. However, since the normal flow of operations is for data to be read (loaded), then processed, and then written (stored) back to memory, it is common for pipelines of any length to have the problems discussed above. That is, store data is usually available at or near the last stage of the pipeline, but store and load addresses and control signals are available at an earlier stage. Load data is normally returned in the pipeline stage following the issuance of a load request. For a short pipeline, the store data may be available in the stage following the stage in which store addresses are issued.

The memory subsystem places the load and store addresses and store data in a first-in-first-out queue in the order in which they are received so that coherency is preserved. When the processor issues a store address, it places these and all related controls in the queue. When the processor issues data, it matches the data with the oldest queue position which has a store address waiting to be processed, but for which data has not been issued. If a store address reaches the first queue position without data, the queue must stop processing requests until the data arrives, but it can continue to receive addresses until all queue positions are filled.

The above referenced patent application entitled "A Parameterizable Queued Memory Access System" discloses a memory input queue suitable for use in the present invention. That queue includes means for loading read and write requests into the lowest unused queue position and shifting pending requests as requests are completed or executed. In a preferred embodiment, two such queues are used, i.e. an address queue and a data queue. The address queue stores the load and store addresses issued at stage five of the pipeline, FIG. 2. The data queue stores the store data issued at stage eight of the pipeline. When a store address reaches the execution stage of the address queue, the memory subsystem checks for valid data in the execution stage of the data queue. If data is available, the subsystem executes the store request by coupling the store address and associated store data to a memory. If not, it waits until data is available. Since addresses are issued in order, the data will be matched with the proper store address. By proper selection of queue lengths, stalls may be minimized. Note that the length of the data queue need not be the same as the address queue. The data queue may be shorter since the store data is not sent to the data queue for one or more clock cycles after store addresses are issued to the address queue.

The result of this method of operation is that the instruction pipeline can operate more efficiently because it does not have to delay other transactions while waiting for store data for a store address. Transaction order is maintained because all transactions are issued from the same pipeline stage. The processor itself can be smaller because it does not have to have logic that avoids port conflicts.

With reference to FIG. 3, there is illustrated a typical processor system 10 with a memory interface unit 12 which provides the circuitry to allow a processor to operate an instruction pipeline with store addresses and store data issued independently as described above. The processor 14 is coupled through two ports 16 to the interface 12, which likewise is coupled by two ports 18 to memories 20 through cache 22. The processor 14 and memories 20 are also coupled to a system bus 24 which may be an Advanced High-performance Bus, AHB, operating under the Advanced Microcontroller Bus Architecture, AMBA, as described in the AMBA Specification published by ARM Limited. In this embodiment, the processor 14 and memory 20 are coupled to the bus 24 by a bridge 26 which allows the processor to act as a master on bus 24 and by bridge 28 which allows the processor memory 20 to act as a slave on the bus 24. The coupling to bus 24 allows the processor 14 and memory 20 to interact with other cores, memory and peripherals 30 connected directly to bus 24 and with slow peripherals 32 coupled to bus 24 by a bridge 34.

Figure 4:
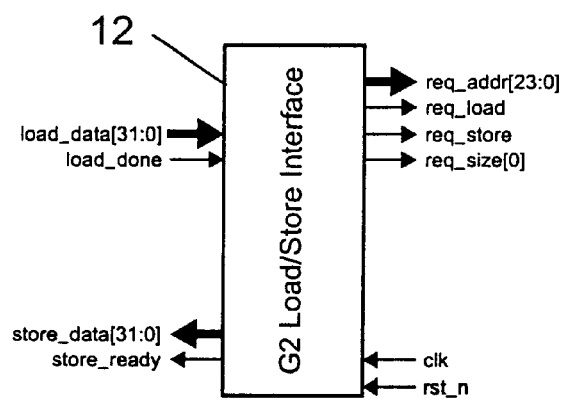
FIG. 4 is a block diagram illustrating the interface pin list for the memory interface unit.

FIG. 4 provides a list of interface pins for the memory interface unit 12. Except for the clk (clock), and rst_n (reset), signals, all of the signals shown are signals which are sent to, or received from, the memory 20. Each of these signals and related functions are described below.

The clock signal, clk, is received from the processor system and provides timing for all transactions on the interface 12. All other signals, except rst_n, are sampled on the rising edge of clk and all other timing parameters are defined with respect to this edge.

The reset signal, rst_n, is received from the processor system and is used to bring registers, sequencers, and signals to a consistent state. Anytime rst_n is asserted, all output signals must be driven to their benign state and all inputs must be ignored. In general, this means that request and done signals must be driven inactive and data inputs are ignored. The reset signal may be asynchronous to clk when asserted or deasserted. Although asynchronous, deassertion of the reset signal must be a clean, bounce free edge. The suffix "n" means that a signal is asserted at a low logic level. Signals without this suffix are asserted at a high logic level.

A request bus is defined by a group of signals with the prefix "req_". These signals provide the address and controls for load and store requests.

The request address signal, req_addr[23:0], is a twenty-four bit wide address generated by the processor to indicate the memory address which the processor wishes to access. The req_addr signal is valid only when req_load or req_store is asserted at the rising edge of clk.

The request load signal, req_load, is asserted by the processor to indicate to the memory that current req_addr [23:0] is a valid load, i.e. read, address. The req_load signal is never asserted with req_store at the same clock edge. During reset, req_load is zero.

The store request signal, req store, is asserted by the processor to indicate to memory that the address is a valid store, i.e. write, address. This signal is never asserted with req_load at the same clock edge. During reset, req_store is zero.

The request size signal, req_size, is asserted by the processor to indicate to memory the size of the read or write access. When zero, the requested size is sixteen bits. When one, the size is thirty-two bits. This signal is valid only when either req_store or req_load is asserted.

Two signals having the prefix "load_" form a load data bus. The load done signal, load_done, is asserted by the memory subsystem to tell the processor that the oldest outstanding load request has been completed. During reset, this signal is zero.

The load data signal, load_data[31:0], is a thirty-two-bit wide data bus used to return read data from the memory to the processor. Data on this bus is valid only when load_done is asserted. When the requested size was sixteen bits, the load data is always returned on load_data[15:0] and load_data[31:16] is ignored.

Two signals having the prefix "store_" form a store data bus. The store ready signal, store_ready, is asserted by the processor to tell the memory subsystem that the processor has asserted valid store data on the store_data bus. During reset, this signal is zero.

The store data signal, store_data[31:0], is used by the processor to send write data to the memory subsystem. Data on this bus is valid only when store_ready is asserted. When the requested size was sixteen bits, the store data is only valid on store_data[15:0] and store_data[31:16] is ignored.

All signals, except for rst_n are sampled on the rising edge of the clock signal and are therefore synchronous signals. Each signal has a setup and hold aperture with respect to the rising edge, in which transitions are not allowed. Outside this aperture, signal values or transitions have no significance. This aperture occurs only on "qualified" rising clock edges for req_addr, load_data, req_size, and store_data and on every rising clock edge for req_load, req_store, load_done, and store_ready. The rst_n signal is neither qualified nor synchronous.

The request bus transfers "access requests" to the memory subsystem. The addresses for these transactions are decoupled from the actual data transfer, so that the process of requesting isn't bogged down by the data transfers.

All request bus transfers are started with two signals. The req_store signal is driven by the processor to indicate a store address. The req_load signal is driven by the processor to indicate a load address. One, and only one, of these signals can be asserted at the same clock edge.

Asserted coincident with the req_address, the req_size parameter determines the size of the transfer request. When req_size is zero, the transfer size is 16 bits. When req_size is one, the transfer size is 32 bits. The req_size signal is only valid when either the req_store or req_load signals are valid.

The address request bus is a 16 bit addressable bus. In other words, the minimum addressable datum is a 16-bit datum. This embodiment includes 24 bits of address space which is equivalent to 16 megawords of address space.

A series of timing diagrams will now be used to demonstrate the operation of a DSP instruction pipeline and the interface 12 in the embodiment described herein. These diagrams illustrate that the issuance of store addresses is independent of the issuance of store data corresponding to the addresses.

Figure 5:
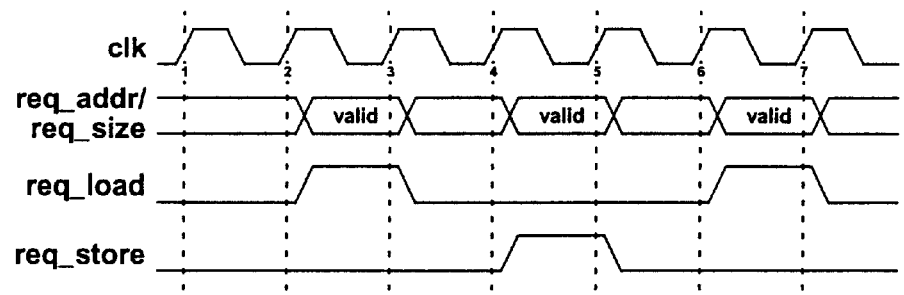
FIG. 5 is a timing diagram illustrating issuance of a load address followed by a store address and another load address.

FIG. 5 illustrates issuance of a load address followed by a store address and another load address on the request bus. On positive clock edge 3, the processor asserted a valid request address, size, and the load signal. On clock 5, the processor asserts a valid address, a valid size, and the store request. The access on clock edge 7 is similar to the first read request. On positive clock edge 7, the processor asserted a valid request address, size, and the load signal.

Figure 6:
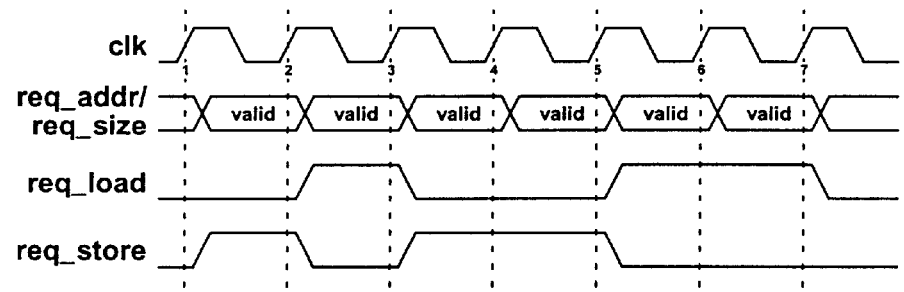
FIG. 6 is a timing diagram illustrating issuance of several back-to-back load and store addresses on the request bus.

FIG. 6 illustrates issuance of several back-to-back store and load addresses on the request bus. This figure illustrates that reads and writes can occur in any order.

Transfer control on the load data bus is governed by the load_done signal. When load_done is asserted, the data on the load_data bus is valid. The load_done signal is zero at reset, load_data is undefined. Data is returned to the processor strictly in the order in which it was requested.

Data for 16 bit load requests is returned on load_data bits 15 through 0 and load_data bits 31 through 16 are to be ignored. Data for 32-bit loads is returned directly on the 32-bit load_data bus. No reordering of the data is done. In other words, the data for the lower address of the transaction is in position 15 through 0, and the data for the upper address of the transaction is in position 31 through 16.

Figure 7:
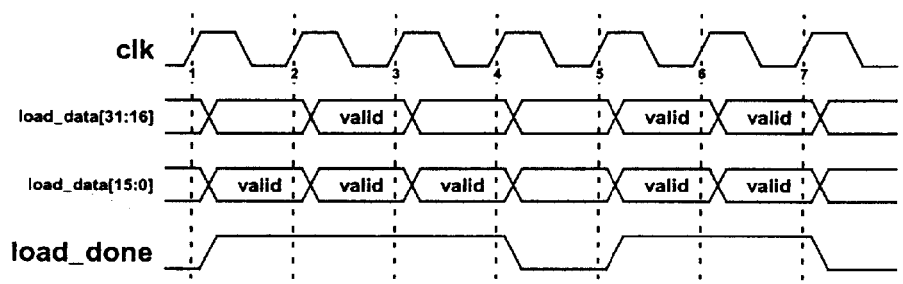
FIG. 7 is a timing diagram illustrating load data bus transactions.

FIG. 7 illustrates transactions on the load data bus. When a load has finished in the memory subsystem, the load is returned on the load_data bus. In this example, data for 5 separate loads is returned. The first and third data returns are 16 bit loads. Data returns on clock edges 2, 3, 4, 6, and 7.

Transfer control on the store data bus is governed by the store ready signal. When the store_ready signal is asserted, the data on the store_data bus is valid. At reset, store_ready is zero and store_data is undefined. The number of store requests is mirrored exactly by the number store_ready cycles. Data from the processor is issued strictly in the order in which store or write addresses are issued.

Store requests can have two sizes. Data for 16 bit stores is returned on store_data bits 15 through 0 and store_data bits 31 through 16 are ignored. Data for 32 bit stores is returned directly on the 32-bit store_data bus. No reordering of the data is done. In other words, the data for the lower address of the transaction is in position 15 through 0, and the data for the upper address of the transaction is in position 31 through 16.

Figure 8:
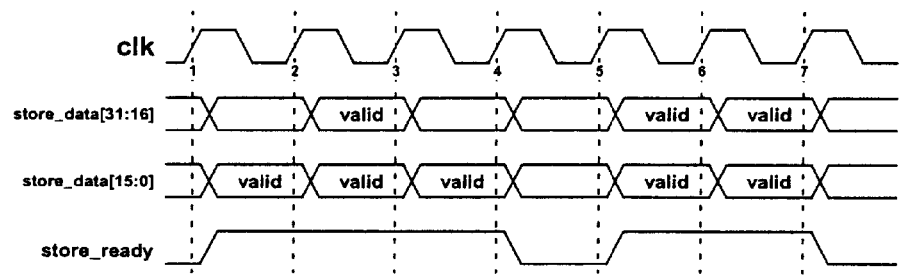
FIG. 8 is a timing diagram illustrating store data bus transactions.

FIG. 8 illustrates transactions on the store data bus. When a store has finished in the memory subsystem, it is returned on the store_data bus. In this example, data for 5 separate store requests is returned. The first and third data returns are 16 bit stores. Data returns on clock edges 2, 3, 4, 6, and 7.

The interface 12 is part of processor 14. The request bus signals are driven by the processor 14. In order to simplify timing for these signals, they are directly driven from registers inside the processor. To simplify timing, this signal is defined so that it is also driven by a register into the processor.

The load_data bus is special, because the processor 14 registers the load_data before using it. This must be done because the timing path from the memory subsystem could be quite long. The memory subsystem must drive the load_done signal from a register.

Both the store_data and the store_ready are driven from registers by the processor 14. This simplifies timing.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. A method for operating an instruction pipeline in a processor comprising:
   issuing a store address at a designated stage in a pipeline;
   issuing a load address in said designated stage;
   issuing store data associated with said store address at a different stage than the designated stage in said pipeline;
   storing said store and load addresses in an address queue in the order in which they are issued;
   storing store data in a data queue in the order in which it is issued;
   coupling said addresses in said address queue to a memory; and coupling store data in said data queue to said memory for each store address coupled to said memory.

2. A method of claim 1 wherein:
said issuing store data occurs at a stage later than said designated stage.

3. A method of claim 1 wherein:
said issuing store data occurs at the next stage following said designated stage.

4. The method of claim 1 wherein:
generating a store address at a stage prior to said designated stage.

5. The method of claim 4 wherein:
said generating a store address occurs at a fourth stage in said pipeline and
wherein said designated stage is a fifth stage in said pipeline.

6. The method of claim 1 wherein:
said issuing store data occurs in the last stage of said pipeline.

7. The method of claim 6 wherein:
said last stage of said pipeline is an eighth stage.

8. The method of claim 1, further comprising:
using an address queue which is longer than said data queue.

9. Apparatus comprising:
a processor having an instruction pipeline issuing store addresses at a designated pipeline stage and issuing store data associated with each store address at a different pipeline stage; and
a memory interface coupled to said processor having at least one queue receiving said store addresses and associated store data and issuing each said store address and said associated store data to memory.

10. The apparatus of claim 9 wherein said pipeline issues store data at a pipeline stage later than said designated pipeline stage.

11. The apparatus of claim 9 wherein said pipeline issues store data at the next pipeline stage following said designated pipeline stage.

12. The apparatus of claim 9 wherein said processor:
generates store addresses at a stage prior to said designated stage.

13. The apparatus of claim 9 wherein said processor:
generates store addresses at a fourth stage in said pipeline and
wherein said designated stage is a fifth stage in said pipeline.

14. The apparatus of claim 9 wherein said processor:
issues store data occurs in the last stage of said pipeline.

15. The apparatus of claim 14 wherein:
said last stage of said pipeline is an eighth stage.

16. The apparatus of claim 9 wherein:
said pipeline issues load addresses at said designated pipeline stage.

17. The apparatus of claim 16 wherein said at least one queue comprises:
an address queue which stores said store addresses and said load addresses in the order in which they are issued by said pipeline, and
a data queue which stores said store data in the order in which said data is issued by said pipeline.

18. The apparatus of claim 17 wherein:
said address queue and said data queue are of different lengths.

19. The apparatus of claim 17 wherein:
said address queue is longer than said data queue.

20. A system for coupling data transaction requests from a processor to a memory comprising:
pipeline means for issuing store addresses at a designated pipeline stage and for issuing store data associated with each store address at a different pipeline stage; and
queue means for receiving store addresses and store data from said pipeline means and coupling each store address and its associated store data to a memory for processing.

21. The system of claim 20 wherein:
said pipeline means issues said store data at a stage later than said designated stage.

22. The system of claim 20 wherein:
said pipeline means issues said data at the next stage following said designated stage.

23. The system of claim 20 wherein:
said pipeline means generates store addresses at a stage prior to said designated stage.

24. The system of claim 20 wherein:
said pipeline means generates store addresses at a fourth stage in said pipeline and wherein said designated stage is a fifth stage in said pipeline.

25. The system of claim 20 wherein:
said pipeline issues store data in the last stage of said pipeline.

26. The system of claim 25 wherein:
said last stage of said pipeline is an eighth stage.

27. The system of claim 20 wherein:
said pipeline means further comprises means for issuing load addresses at said designated pipeline stage, and
said queue means further comprises means for storing said load addresses and for coupling said load addresses and said store addresses to said memory in the order in which they were issued by said pipeline means.

* * * * *